(12) United States Patent
Ryoshi et al.

(10) Patent No.: US 12,249,708 B2
(45) Date of Patent: Mar. 11, 2025

(54) POSITIVE ELECTRODE ACTIVE MATERIAL FOR NONAQUEOUS ELECTROLYTE SECONDARY BATTERY, METHOD FOR PRODUCING THE SAME, POSITIVE ELECTRODE MIXTURE PASTE FOR NONAQUEOUS ELECTROLYTE SECONDARY BATTERY, AND NONAQUEOUS ELECTROLYTE SECONDARY BATTERY

(71) Applicant: SUMITOMO METAL MINING CO., LTD., Tokyo (JP)

(72) Inventors: Kazuomi Ryoshi, Niihama (JP); Yoshihiro Otsuka, Niihama (JP); Hiroko Oshita, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 520 days.

(21) Appl. No.: 16/617,768

(22) PCT Filed: May 31, 2018

(86) PCT No.: PCT/JP2018/020988
§ 371 (c)(1),
(2) Date: Apr. 14, 2020

(87) PCT Pub. No.: WO2018/221664
PCT Pub. Date: Dec. 6, 2018

(65) Prior Publication Data
US 2020/0251732 A1 Aug. 6, 2020

(30) Foreign Application Priority Data
May 31, 2017 (JP) .................. 2017-108035

(51) Int. Cl.
*H01M 4/525* (2010.01)
*H01M 4/02* (2006.01)
(Continued)

(52) U.S. Cl.
CPC ......... *H01M 4/525* (2013.01); *H01M 4/0471* (2013.01); *H01M 4/131* (2013.01);
(Continued)

(58) Field of Classification Search
CPC .. H01M 4/0471; H01M 4/131; H01M 4/1391; H01M 4/364; H01M 4/366;
(Continued)

(56) References Cited

U.S. PATENT DOCUMENTS

2009/0202905 A1\* 8/2009 Morita .................. H01M 4/525
429/212
2011/0315918 A1 12/2011 Kawai et al.
(Continued)

FOREIGN PATENT DOCUMENTS

CN 101510605 A 8/2009
CN 103339767 A 10/2013
(Continued)

OTHER PUBLICATIONS

International Search Report dated Aug. 28, 2018, issued in counterpart Application No. PCT/JP2018/020988, with English translation (4 pages).
(Continued)

*Primary Examiner* — Ekandra S. Miller-Cruz
*Assistant Examiner* — Ankith R Sripathi
(74) *Attorney, Agent, or Firm* — WHDA, LLP

(57) ABSTRACT

The positive electrode active material for a nonaqueous electrolyte secondary battery contains a lithium-nickel composite oxide represented by a general formula: $Li_aNi_{1-x-y}Co_xM_yO_{2+\alpha}$ (where $0.01 \le x \le 0.35$, $0 \le y \le 0.10$,
(Continued)

$0.95 \leq a \leq 1.10$, and $0 \leq \alpha \leq 0.2$; and M is at least one element selected from Mn, V, Mg, Mo, Nb, Ti, and Al) and a boron compound. At least part of the boron compound is present on the surface of the lithium-nickel composite oxide in the form of $Li_3BO_3$ and $LiBO_2$, and a mass ratio ($Li_3BO_3/LiBO_2$) between $Li_3BO_3$ and $LiBO_2$ is at least 0.005 and up to 10. Boron is contained in an amount of at least 0.011% by mass and up to 0.6% by mass relative to the entire amount of the positive electrode active material.

10 Claims, 2 Drawing Sheets

(51) Int. Cl.
| | | |
|---|---|---|
| *H01M 4/04* | (2006.01) | |
| *H01M 4/131* | (2010.01) | |
| *H01M 4/36* | (2006.01) | |
| *H01M 4/505* | (2010.01) | |
| *H01M 10/0525* | (2010.01) | |
| *H01M 50/46* | (2021.01) | |

(52) U.S. Cl.
CPC ........... *H01M 4/364* (2013.01); *H01M 4/505* (2013.01); *H01M 10/0525* (2013.01); *H01M 50/46* (2021.01); *H01M 2004/021* (2013.01); *H01M 2004/027* (2013.01); *H01M 2004/028* (2013.01)

(58) Field of Classification Search
CPC ................. H01M 4/505; H01M 4/525; H01M 2004/021; H01M 2004/027; H01M 2004/028; H01M 10/0525
See application file for complete search history.

(56) References Cited

U.S. PATENT DOCUMENTS

| | | |
|---|---|---|
| 2012/0231335 A1 | 9/2012 | Morita et al. |
| 2013/0316237 A1* | 11/2013 | Miki ................ H01M 4/525 427/58 |
| 2014/0170494 A1 | 6/2014 | Paulsen et al. |
| 2017/0263920 A1* | 9/2017 | Choi ................ H01M 4/485 |
| 2018/0026268 A1* | 1/2018 | Yun ................ H01M 4/0471 429/223 |
| 2022/0069301 A1* | 3/2022 | Yun ................ H01M 4/0471 |

FOREIGN PATENT DOCUMENTS

| | | | | |
|---|---|---|---|---|
| JP | 5-24891 A | 2/1993 | | |
| JP | 9-115515 A | 5/1997 | | |
| JP | 10-79244 A | 3/1998 | | |
| JP | 2009-146739 A | 7/2009 | | |
| JP | 2012-28313 A | 2/2012 | | |
| JP | 2013-84395 A | 5/2013 | | |
| JP | 2014-513392 A | 5/2014 | | |
| JP | 2018186077 | * 11/2018 | ........ H01M 10/0562 |
| KR | 20180010122 | * 1/2018 | .......... H01M 4/0471 |
| WO | 2016/032289 A1 | 3/2016 | | |

OTHER PUBLICATIONS

Notification of Transmittal of Translation of the International Preliminary Report on Patentabililty (Form PCT/IB/373) issued in counterpart International Application No. PCT/JP2018/020988 mailed Dec. 3, 2019 with Forms PCT/ISA/237, with English translation (9 pages).
Office Action dated Aug. 9, 2022, issued in counterpart CN application No. 201880034765.3, with English translation. (13 pages).

* cited by examiner

POSITIVE ELECTRODE ACTIVE MATERIAL FOR NONAQUEOUS ELECTROLYTE SECONDARY BATTERY, METHOD FOR PRODUCING THE SAME, POSITIVE ELECTRODE MIXTURE PASTE FOR NONAQUEOUS ELECTROLYTE SECONDARY BATTERY, AND NONAQUEOUS ELECTROLYTE SECONDARY BATTERY

TECHNICAL FIELD

The present invention relates to a positive electrode active material for a nonaqueous electrolyte secondary battery, a method for producing the same, a positive electrode mixture paste for a nonaqueous electrolyte secondary battery, and a nonaqueous electrolyte secondary battery.

BACKGROUND ART

In recent years, with the proliferation of portable electronic equipment such as cellular phones and notebook personal computers, development of a nonaqueous electrolyte secondary battery with reduced size and weight having high energy density is demanded. Development of a secondary battery with high output is also demanded as a battery for electric vehicles including hybrid vehicles. A lithium-ion secondary battery is a nonaqueous electrolyte secondary battery satisfying such a demand. The lithium-ion secondary battery includes a negative electrode, a positive, electrode, and an electrolyte solution, in which for active materials of the negative electrode and the positive electrode, materials that can de-insert and insert lithium are used.

Among such lithium-ion secondary batteries, the research and development of which are currently energetically being conducted, lithium-ion secondary batteries containing a layered or spinel type lithium-metal composite oxide as a positive electrode active material as a positive electrode active material can obtain as high voltage as 4 V class and are thus being practically used as batteries having high energy density. Examples of the material that have been so far mainly presented include lithium-cobalt composite oxide ($LiCoO_2$), which is relatively easily synthesized; a lithium-nickel composite oxide ($LiNiO_2$) and a lithium-nickel-cobalt-manganese composite oxide ($LiNi_{1/3}Co_{1/3}O_2$) containing nickel, which is lower in price than cobalt; and a lithium-manganese composite oxide ($LiMn_2O_4$) containing manganese.

Among these, for batteries containing the lithium-cobalt composite oxide, development for obtaining excellent initial capacity characteristics and cycle characteristics has widely been conducted, and various outcomes have already been achieved. However, the lithium-cobalt composite oxide uses a cobalt compound, which is expensive, as a raw material, and thus the unit price per capacity of batteries containing this lithium-cobalt composite oxide is greatly higher than that of a nickel hydrogen battery, and applicable uses are considerably limited. Consequently, not only for small-sized secondary batteries for portable devices, but also for large-sized secondary batteries for power storage and electric vehicles, there are large expectations for a reduction in the cost of the positive electrode active material and the feasibility of production of lithium-ion secondary batteries lower in price, and it can be said that their fulfillment has industrially large meaning.

As a new material of an active material for lithium-ion secondary batteries, a lithium-nickel composite oxide, which contains nickel lower in price than cobalt, can be mentioned. This lithium-nickel composite oxide shows an electrochemical potential lower than that of the lithium-cobalt composite oxide and is thus less problematic in decomposition by the oxidation of an electrolyte solution, is expected to give a higher capacity, and shows a high battery voltage like a cobalt-based one, and it is vigorously being developed especially for electric vehicles. However, it is difficult even for an electric vehicle installing a battery produced using the lithium-nickel composite oxide mentioned in Patent Literature 1 and the like to achieve a mileage equal to that of gasoline vehicles, and a higher capacity has been demanded.

Furthermore, that gelation of a positive electrode mixture paste easily occurs can be mentioned as a drawback of the lithium-nickel composite oxide. A positive electrode of a nonaqueous electrolyte secondary battery is formed by mixing a positive electrode active material, a binder such as polyvinylidene fluoride (PVDF), and a solvent such as N-methyl-2-pyrrolidone (NMP) together to form a positive electrode mixture paste and applying the positive electrode mixture paste to a collector such as aluminum foil, for example. In this process, when lithium is released from the positive electrode active material in the positive electrode mixture paste, it may react with water contained in the binder and the like to form lithium hydroxide. It is considered that this produced lithium hydroxide and the binder react with each other to cause the positive electrode mixture paste to gelate. Gelation of the positive electrode mixture paste brings about the badness of handleability and the worsening of yield. This tendency is conspicuous when lithium in the positive electrode active material is excessive than a stoichiometric ratio and the ratio of nickel is high.

Some attempts to inhibit gelation of the positive electrode mixture paste have been made. Patent Literature 2 presents a positive electrode composition for a nonaqueous electrolyte solution secondary battery containing a positive electrode active material containing a lithium-transition metal composite oxide and additional particles containing acidic oxide particles, for example. It is stated that lithium hydroxide produced by a reaction between water contained in a binder and lithium released from the positive electrode active material preferentially reacts with the acidic oxide and inhibits a reaction between the produced lithium hydroxide and the binder, whereby this positive electrode composition inhibits gelation of the positive electrode mixture paste. It is also stated that the acidic oxide plays a role as a conductive material within a positive electrode, reduces the resistance of the entire positive electrode, and contributes to improvement in battery output characteristics.

Patent Literature 3 presents a method for producing a lithium-ion secondary battery, the method for producing a lithium-ion secondary battery including preparing a lithium-transition metal composite oxide containing LiOH outside the composition as a positive electrode active material; grasping a molar amount P of LiOH contained in 1 g of the positive electrode active material; preparing 0.05 mol or more of tungsten oxide in terms of tungsten atom per 1 mol of LIOH relative to the molar amount P of LiOH; and kneading the positive electrode active material and tungsten oxide with an organic solvent together with a conductive material and a binding agent to prepare a positive electrode mixture paste.

Patent Literature 4 discloses a technique in which boric acid or the like as an inorganic acid is contained in an electrode containing a lithium-transition metal composite oxide to prevent gelation of an electrode paste. Lithium nickelate is disclosed as a specific example of the lithium-transition metal composite oxide.

CITATION LIST

Patent Literature

[Patent Literature 1] Japanese Unexamined Patent Application Publication No. H05-242891
[Patent Literature 2] Japanese Unexamined Patent Application Publication No. 2012-28313
[Patent Literature 3] Japanese Unexamined Patent Application Publication No. 2013-84395
[Patent Literature 4] Japanese Unexamined Patent Application Publication No. H10-79244

SUMMARY OF INVENTION

Technical Problem

However, even the positive electrode active material described in Patent Literature 1 is not sufficient as a secondary battery for electric vehicles, and a much higher capacity is being demanded. The presentation of Patent Literature 2 may cause damage to the separator caused by the remaining of the acidic oxide particles and a reduction in thermal stability associated therewith. In addition, inhibition of gelation of the positive electrode mixture paste is less than sufficient. Furthermore, although increasing the added amount of the acidic oxide can improve inhibition of gelation, addition of the acidic oxide increases material cost, or a weight increase caused by addition of the acidic oxide deteriorates a battery capacity per unit mass.

The presentation of Patent Literature 3 does not eliminate the damage to the separator caused by the remaining of the acidic oxide and the problem about inhibition of gelation. Tungsten as a heavy element that does not contribute to charging discharging is added, whereby a reduction in battery capacity per weight is large.

In the presentation of Patent Literature 4, a positive electrode active material, a conductive material, and a binding agent are added to a solvent to which boric acid or the like is added and are mixed while stirring; this method may cause local gelation by the time when the positive electrode active material is sufficiently dispersed.

In view of these problems, an object of the present invention is to provide a positive electrode active material for a nonaqueous electrolyte secondary battery having a high battery capacity when used for a positive electrode active material and capable of inhibiting gelation of a positive electrode mixture paste.

Solution to Problem

To solve the above problems, the inventor of the present invention has earnestly studied a lithium-metal composite oxide being used as a positive electrode active material for a nonaqueous electrolyte secondary battery and a method for producing the same and has acquired knowledge that two kinds of boron compounds are caused to be present on the surface of a lithium-nickel composite oxide with a specific content ratio, whereby a positive electrode active material with an improved battery capacity and capable of inhibiting gelation of a positive electrode mixture paste can be obtained to complete the present invention.

A first aspect of the present invention provides a positive electrode active material for a nonaqueous electrolyte secondary battery containing: a lithium-nickel composite oxide represented by a general formula: $Li_aNi_{1-x-y}Co_xM_yO_{2+\alpha}$ (where $0.01 \leq x \leq 0.35$, $0 \leq y \leq 0.10$, $0.95 \leq a \leq 1.10$, and $0 \leq \alpha \leq 0.2$; and M is at least one element selected from Mn, V, Mg, No, Nb, Ti, and Al); and a boron compound. At least part of the boron compound is present on a surface of the lithium-nickel composite oxide in the form of $Li_3BO_3$ and $LiBO_2$, and a mass ratio ($Li_3BO_3/LiBO_2$) between $Li_3BO_3$ and $BiBO_2$ is at least 0.005 and up to 10. Boron is contained in an amount of at least 0.011% by mass and up to 0.6% by mass relative to an entire amount of the positive electrode active material.

A second aspect of the present invention provides a method for producing a positive electrode active material for a nonaqueous electrolyte secondary battery including: mixing a nickel composite hydroxide or a nickel composite oxide, a lithium compound, and a first boron compound capable of reacting with lithium together so as to give a boron amount A in the first boron compound of at least 0.001% by mass and up to 0.1% by mass relative to an entire amount of a positive electrode active material to obtain a lithium mixture; firing the lithium mixture in an oxygen atmosphere at at least 700° C. and up to 800° C. to obtain a first lithium-nickel composite oxide; and mixing the first lithium-nickel composite oxide and a second boron compound capable of reacting with lithium with each other so as to give a boron amount B in the second boron compound of at least 0.01% by mass and up to 0.5% by mass relative to the entire amount of the positive electrode active material and so as to give a ratio (A/B) between the boron amount A in the first boron compound and the boron amount B in the second boron compound of at least 0.005 and up to 10 to obtain a second lithium-nickel composite oxide. The first boron compound and the second boron compound are the same compound or different compounds. The second lithium-nickel composite oxide is represented by a general formula $Li_aNi_{1-x-y}Co_xM_yO_{2+\alpha}$ (where $0.05 \leq x \leq 0.35$, $0 \leq y \leq 0.10$, $0.95 \leq a \leq 1.10$, and $0 \leq \alpha \leq 0.2$; and M is at least one element selected from Mn, V, Ma, Mo, Nb, Ti, and Al) and has $Li_3BO_3$ and $LiBO_2$ on a surface thereof.

The first boron compound preferably contains at least one selected from $H_3BO_3$, $B_2O_3$, and $LiBO_2$. The second boron compound preferably contains either one or both of $H_3BO_3$ and $B_2O_3$.

A third aspect of the present invention provides a positive electrode mixture paste for a nonaqueous electrolyte secondary battery containing the above-described positive electrode active material for a nonaqueous electrolyte secondary battery.

A fourth aspect of the present invention provides a nonaqueous electrolyte secondary battery including a positive electrode, a negative electrode, a separator, and a nonaqueous electrolyte, the positive electrode containing the above-described positive electrode active material.

Advantageous Effects of Invention

The present invention can obtain a positive electrode active material for a nonaqueous electrolyte secondary battery having a high battery capacity when used for a positive electrode material of a secondary battery and capable of inhibiting gelation of a positive electrode mixture paste. Furthermore, the method for producing the same is easy and suitable for production on an industrial scale, and its industrial value is extremely high.

DESCRIPTION OF EMBODIMENTS

Figure 1:
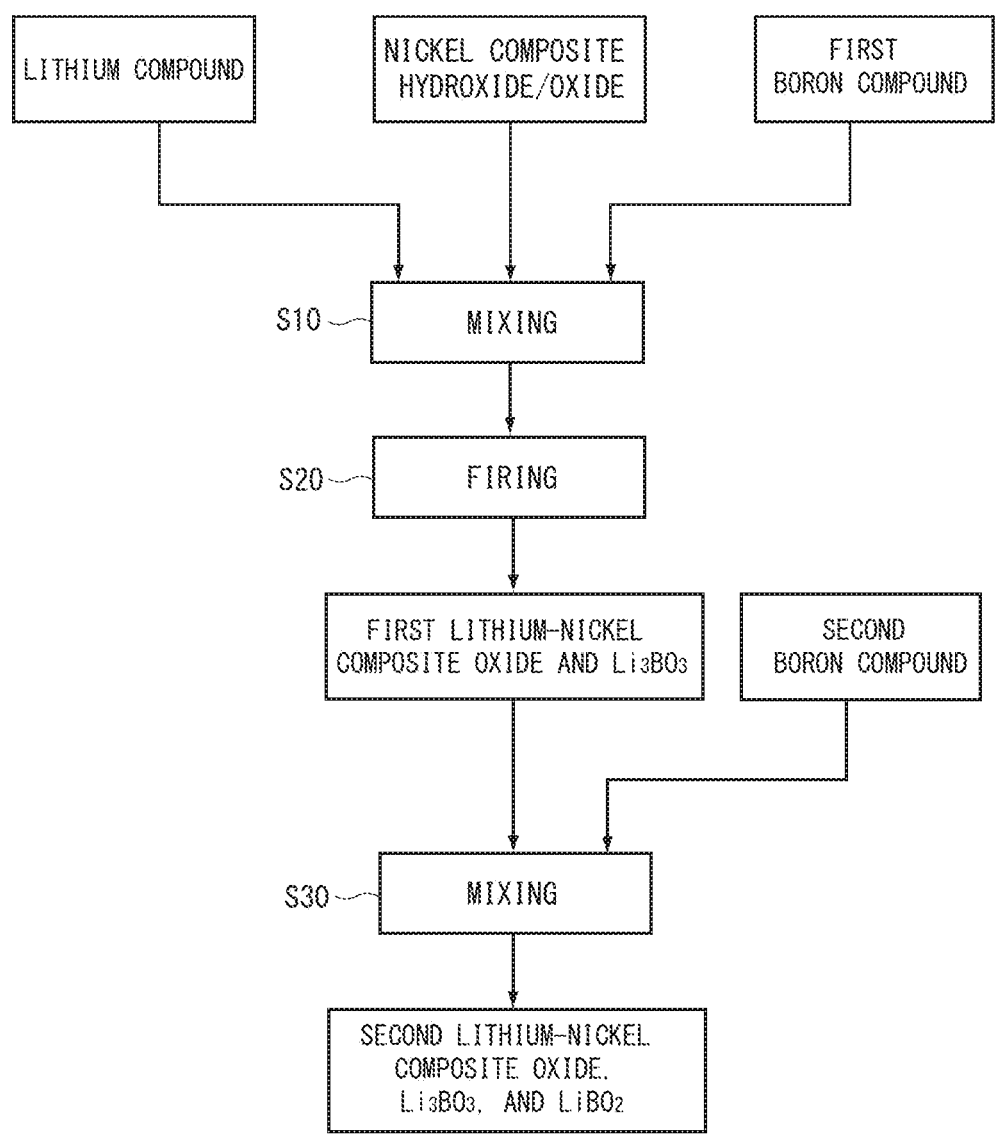
FIG. 1 is a diagram of an exemplary method for producing a positive electrode active material for a nonaqueous electrolyte secondary battery of an embodiment.

The following describes a positive electrode active material for a nonaqueous electrolyte secondary battery, a method for producing the same, a positive electrode mixture paste, and a nonaqueous electrolyte secondary battery according to the present invention. The present invention is not limited to the following detailed description unless otherwise limited.

1. Positive Electrode Active Material for Nonaqueous Electrolyte Secondary Battery A positive electrode active material for a nonaqueous electrolyte secondary battery according to the present embodiment (hereinafter, also referred to as a "positive electrode active material") contains a lithium-nickel composite oxide represented by General Formula (1): $Li_aNi_{1-x-y}Co_xM_yO_{2+\alpha}$ (where $0.01 \leq x \leq 0.35$, $0 \leq y \leq 0.10$, $0.95 \leq a \leq 1.10$, and $0 \leq \alpha \leq 0.2$; and M is at least one element selected from Mn, V, Mg, Mo, Nb, Ti, and Al) and a boron compound. The boron compound refers to a compound containing boron. The contents of the respective elements can be measured by inductively coupled plasma (ICP) emission spectrometry.

In General Formula (1), x indicating the content of cobalt (CO) satisfies $0.01 \leq x \leq 0.35$ and, in view of further improving the battery capacity charging/discharging capacity) of a secondary battery containing the positive electrode active material, preferably $0.01 \leq x \leq 0.20$. The letter x may satisfy $0.05 \leq x \leq 0.35$ or $0.05 \leq x \leq 0.20$.

In General Formula (1), M is at least one element selected from Mn, V, Mg, Mo, Nb, Ti, and Al. M is an additional element and can be selected from a plurality of elements in accordance with required characteristics. M can contain Al, for example. The letter y indicating the content of M satisfies $0 \leq y \leq 0.10$ and, in view of further improving the battery capacity (the charging/discharging capacity) of the secondary battery containing the positive electrode active material, preferably $0 \leq y \leq 0.07$, and more preferably $0 \leq y \leq 0.05$.

In General Formula (1), (1-x-y) indicating the content of nickel (Ni) satisfies $0.55 \leq (1-x-y) \leq 0.95$ and, in view of further improving the battery capacity of the secondary battery containing the positive electrode active material, preferably $0.6 \leq (1-x-y) \leq 0.95$, and more preferably $0.65 \leq (1-x-y) \leq 0.95$.

In General Formula (1), the range of a indicating the content of lithium (Li) is $0.95 \leq a \leq 1.10$. When in General Formula (1) a indicating the content of lithium (Li) is $1 < a$, or when the content of nickel (Ni) is high, for example, gelation of a positive electrode mixture paste tends to be more likely to occur. However, the positive electrode active material of the present embodiment can inhibit gelation of the positive electrode mixture paste and can have a high battery capacity even with the composition that is likely to cause gelation by containing specific boron compounds in a specific ratio.

At least part of the boron compound is present on the surface of the lithium-nickel composite oxide in the form of $Li_3BO_3$ and $LiBO_2$. In the positive electrode active material according to the embodiment, two kinds of lithium boron compounds indicated by $Li_3BO_3$ and $LiBO_2$ are present on the surface of the lithium-nickel composite oxide, whereby when used for a positive electrode of a secondary battery, it has a high battery capacity and can inhibit gelation of the positive electrode mixture paste. The presence form of the boron compound can be determined by XRD diffraction. In the positive electrode active material of the present embodiment, the boron compound formed of $Li_3BO_3$ and $LiBO_2$ is detected by XRD diffraction, for example.

In the positive electrode active material, a mass ratio ($Li_3BO_3/LiBO_2$) between $Li_3BO_3$ and $LiBO_2$ is at least 0.005 and up to 10 and preferably at least 0.01 and up to 5. When the mass ratio ($Li_3BO_3/LiBO_2$) is less than 0.005, in a production process of a positive electrode active material described below, a second boron compound is required to be added in a large amount to a first lithium-nickel composite oxide, and lithium within crystals of the lithium-nickel composite oxide easily reacts with boron in the second boron compound to reduce in amount, and battery capacity may reduce. On the other hand, when the mass ratio ($Li_3BO_3/LiBO_2$) is greater than 10, the added amount of a first boron compound or the second boron compound exceeds a preferred range in the production process of a positive electrode active material described below, and battery characteristics may reduce. The mass ratio ($Li_3BO_3/LiBO_2$) can be calculated from a ratio between Li and B determined by chemical analysis.

In view of achieving both battery capacity and gelation inhibition at a higher level, the positive electrode active material has a mass ratio ($Li_3BO_3/LiBO_2$) of preferably at least 0.05 and up to 2 and more preferably at least 0.05 and up to 1.

The positive electrode active material of the present embodiment contains boron in an amount of at least 0.011% by mass and up to 0.6% by mass relative to the entire amount of the positive electrode active material. When the amount of boron contained in the positive electrode active material is less than 0.011% by mass relative to the entire amount of the positive electrode active material, it is difficult for both the discharging capacity improvement effect and the gelation inhibition effect to be achieved. When the amount of boron is greater than 0.6% by mass, large amounts of $Li_3BO_3$ and $LiBO_2$ are produced on the surface of the lithium-nickel composite oxide to increase resistance, and battery capacity reduces, which is thus not preferred.

In view of achieving both battery capacity and gelation inhibition at a higher level, the positive electrode active material contains boron in an amount of preferably 0.05% by mass or more, preferably 0.055% by mass or more, and more preferably 0.1% by mass or more relative to the entire amount of the positive electrode active material.

2. Method for Producing Positive Electrode Active Material

FIG. 1 is a diagram of an exemplary method for producing a positive electrode active material for a nonaqueous electrolyte secondary battery according to the present embodiment (hereinafter, also referred to as a "method for producing a positive electrode active material). The following describes the method for producing a positive electrode active material according to the present embodiment with reference to FIG. 1. By this method of producing a positive electrode active material, the positive electrode active material containing the lithium-nickel composite oxide and the boron compound described above can be obtained with good productivity on an industrial scale.

The method of production of the present embodiment includes mixing a nickel composite hydroxide or a nickel composite oxide, a lithium compound, and the first boron compound together to obtain a lithium mixture (Step S10), firing the obtained lithium mixture in an oxygen atmosphere at at least 700° C. and up to 800° C. to obtain a first lithium-nickel composite oxide (Step S20), and mixing the obtained first lithium-nickel composite oxide and the second boron compound with each other to obtain a second lithium-nickel composite oxide (Step S30). On the surface of the obtained second lithium-nickel composite oxide, $Li_3BO_3$ and $LiBO_2$ are present.

First, the nickel composite hydroxide or the nickel composite oxide, the lithium compound, and the first boron compound are mixed together to obtain the lithium mixture (Step S10).

For the first boron compound, a boron compound capable of reacting with lithium can be used; examples thereof include boron oxide ($B_2O_3$), boric acid ($H_3BO_3$), ammonium tetraborate tetrahydrate (($NH_4)_2B_4O_7 \cdot 4H_2O$), ammonium pentaborate octahydrate (($NH_4)_2O \cdot 5B_2O_3 \cdot 8H_2O$), and $LiBO_2$. Among these, at least one selected from $H_3BO_3$, $B_2O_3$, and $LiBO_2$ is preferably used, and at least either $H_3BO_3$ or $B_2O_3$ is more preferably used. These boron compounds have high reactivity with a lithium salt, and it is considered that they react with lithium derived from the lithium compound used as a raw material after a firing process (Step S20) described below to mainly form $Li_3BO_3$. In order not to reduce the amount of lithium contained in crystals of the positive electrode active material, in a mixing process (Step S10), other than the lithium compound contributing to the formation of the lithium-nickel composite oxide, a lithium salt containing lithium in an amount with which boron in the added first boron compound can sufficiently produce $Li_3BO_3$ may simultaneously be added.

The first boron compound is mixed such that a boron amount A in the first boron compound is preferably at least 0.001% by mass and up to 0.1% by mass, more preferably at least 0.003% by mass and up to 0.08% by mass, and even more preferably at least 0.01% by mass and up to 0.08% by mass relative to the entire amount of the positive electrode active material. When the boron amount A is within the above range, when a positive electrode active material to be obtained is used for a secondary battery, battery capacity (discharging capacity) can be improved. When the boron amount A is less than 0.001% by mass, a flux effect described below is insufficient, and an effect of improving battery capacity is not produced. On the other hand, when the boron amount A to be mixed is greater than 0.08% by mass, $Li_3BO_3$ is produced in a large amount in the positive electrode active material to be obtained to cause resistance, and capacity reduces, which is thus not preferred.

When the boron amount A of the first boron compound is mixed with the above range, and the obtained lithium mixture is fired (Step S20), boron derived from the first boron compound reacts with Li present on the surface of the first lithium-nickel composite oxide to form $Li_3BO_3$. It is considered that at the firing process (Step S20), $Li_3BO_3$ formed on the surface of the first lithium-nickel composite oxide exhibits the flux effect to the first lithium-nickel composite oxide and facilitates crystal growth and can thereby make the crystal structure of the lithium-nickel composite oxide perfect. The positive electrode active material of the present embodiment produces the discharging capacity improvement effect when used as a positive electrode of a secondary battery by containing $Li_3BO_3$.

For the nickel composite hydroxide or the nickel composite oxide, which is not limited to a particular compound, known ones can be used; a nickel composite hydroxide obtained by crystallization and/or a nickel composite oxide obtained by performing oxidizing roasting (heat treatment) on this nickel composite hydroxide can be used, for example. For the method for producing the nickel composite hydroxide, both a batch method and a continuous method can be used. In view of cost and fillability, preferred is the continuous method that continuously collects nickel composite hydroxide particles overflowed from a reaction vessel. In view of obtaining particles with higher uniformity, the batch method is preferred.

The substance amount ratios (the molar ratios) of nickel (Ni), cobalt (Co), and the element M of the nickel composite hydroxide or the nickel composite oxide may be represented by Ni:Co:M=(1-x-y):x:y (where $0.01 \leq x \leq 0.35$ and $0 \leq y \leq 0.10$; and M is at least one element selected from Mn, V, Mg, Mo, Nb, Ti, and Al), for example. The molar ratios of the respective elements in the nickel composite hydroxide or the nickel composite oxide are maintained also in the positive electrode active material to be obtained, and preferred ranges of the molar ratios of the respective elements are similar to the ranges of the respective elements in General Formula (1) in the positive electrode active material described above.

Examples of the lithium compound include lithium hydroxide, lithium carbonate, lithium nitrate, and lithium acetate; among these, lithium hydroxide and lithium carbonate are preferred, and in view of reactivity with the boron compound, lithium hydroxide is more preferred.

The lithium compound is mixed in an amount such that a ratio (Li/Me) of the atom number of lithium (Li) to the total of the atom numbers (Me) of metal elements other than lithium is at least 0.95 and up to 1.10. When Li/Me is less than 0.95, the reaction resistance of a positive electrode of a secondary battery containing an obtained positive electrode active material increases, and battery output reduces. When Li/Me is greater than 1.10, the initial discharging capacity of the obtained positive electrode active material reduces, and in addition, the resistance reaction of the positive electrode also increases.

At the mixing process (Step S10), the first boron compound, the nickel composite hydroxide and/or the nickel composite oxide, and the lithium compound are preferably sufficiently mixed together. For the mixing, general mixers can be used; a shaker mixer, a Loedige mixer, a Julia mixer, or a V blender can be used, for example. The first boron compound, the nickel composite hydroxide and/or the nickel composite oxide may sufficiently be mixed with the lithium compound to the extent that the skeleton of composite oxide particles is not destroyed.

Next, the obtained lithium mixture is fired in an oxygen atmosphere at at least 700° C. and up to 800° C. to obtain the first lithium-nickel composite oxide (Step S20). The lithium mixture containing the first boron compound is fired, whereby the first lithium-nickel composite oxide is produced, and simultaneously, $Li_3BO_3$ can be produced on the surface thereof.

The firing temperature is preferably at least 700° C. and up to 800° C. and more preferably at least 720° C. and up to 780° C. When the firing temperature is lower than 700° C., crystals of the first lithium-nickel composite oxide do not sufficiently grow. When the firing temperature is greater than 800° C., decomposition of the first lithium-nickel composite oxide occurs, and battery characteristics reduce, which is thus not preferred.

The retention time at the firing temperature is at least 5 hours and up to 20 hours, for example, and preferably about at least 5 hours and up to 10 hours. The atmosphere during firing is an oxygen atmosphere and is preferably an atmosphere with an oxygen concentration of 100% by volume, for example.

The respective conditions at the mixing process (Step S10) and the firing process (Step S20) can be adjusted as appropriate within the above ranges such that most of boron added as the first boron compound forms $Li_3BO_3$. Part of boron may be solid-solved in the first lithium-nickel composite oxide to the extent that the effects of the present invention are not impaired.

The composition of the first lithium-nickel composite oxide can be represented by General Formula (2): $Li_aNi_{1-x-y}Co_xM_yO_{2+\alpha}$ (where $0.01 \leq x \leq 0.35$, $0 \leq y \leq 0.10$, $0.95 \leq a \leq 1.10$, and $0 \leq \alpha \leq 0.2$; and M is at least one element selected from Mn, V, Mg, Mo, Nb, Ti, and Al) except boron. M in the general formula can contain Al, for example. When the first lithium-nickel composite oxide has the above composition, a higher battery capacity can be obtained. The molar ratios of the respective elements of the first lithium-nickel composite oxide are maintained also in the positive electrode active material to be obtained, and preferred ranges of the molar ratios of the respective elements are similar to the ranges of the respective elements in General Formula (1) in the positive electrode active material described above.

Next, the first lithium-nickel composite oxide and the second boron compound are mixed with each Other to obtain the second lithium-nickel composite oxide (Step S30). In the present process, the first lithium-nickel composite oxide and the second boron compound are mixed with each other in a dry manner, whereby the excessive lithium in the first lithium-nickel composite oxide and the second boron compound are reacted with each other to form $LiBO_2$. With this reaction, the positive electrode active material of the present embodiment can be obtained on an industrial scale, more easily, and with good productivity. The composition and the molar ratios of the respective elements of the second lithium-nickel composite oxide (the positive electrode active material) are as General Formula (1) described above.

For the second boron compound, a boron compound capable of reacting with lithium other than the lithium compound can be used; examples thereof include boron oxide ($B_2O_3$), boric acid ($H_3BO_3$), ammonium tetraborate tetrahydrate (($NH_4)_2B_4O_7 \cdot 4H_2O$), and ammonium pentaborate octahydrate (($NH_4)_2O \cdot 5B_2O_3 \cdot 8H_2O$). Among these, at least either $H_3BO_3$ or $B_2O_3$ is more preferably used, and $H_3BO_3$ is even more preferred. These boron compounds have high reactivity with lithium hydroxide and can react with the excessive lithium such as lithium oxide present on the surface of the first lithium-nickel composite oxide quickly at the time of addition. The second boron compound may be the same as or different from the first boron compound.

The second boron compound is preferably powdery and preferably has an average particle diameter of at least 5 μm and up to 40 μm. With this structure, the distribution of boron within the positive electrode active material to be obtained is made uniform, and besides, the reaction between the excessive lithium in the first lithium-nickel composite oxide and the second boron compound B is facilitated, and $LiBO_2$ can be formed in a larger amount.

The second boron compound is mixed in an amount such that the boron amount B in the second boron compound is at least 0.01% by mass and up to 0.5% by mass and preferably at least 0.03% by mass and up to 0.4% by mass relative to the entire amount of the positive electrode active material. When the boron amount B is within the above range, the second boron compound reacts with lithium hydroxide (excessive lithium), which is present on the surface of the first lithium-nickel composite oxide and causes gelation, to form $LiBO_2$, whereby gelation of the paste can be inhibited.

When the boron amount B of the second boron compound is less than 0.01% by mass, the added amount is extremely small, and the excessive lithium containing lithium hydroxide remains on the surface of the second lithium-nickel composite oxide, and gelation cannot be inhibited. When the boron amount B of the second boron compound is greater than 0.5% by mass, lithium within the crystals of the lithium-nickel composite oxide is extracted and reacts with the second boron compound to form $LiBO_2$, and thus the amount of lithium within the lithium-nickel composite oxide reduces, and capacity may reduce.

The second boron compound is mixed such that a ratio A/B between the boron amount A of the first boron compound and the boron amount B of the second boron compound (hereinafter, also referred to as a "boron mass ratio A/B") is at least 0.005 and up to 10 and preferably at least 0.01 and up to 5. When the boron mass ratio A/B is within the above range, the second lithium-nickel composite oxide having $Li_3BO_3$ and $LiBO_2$ with an appropriate ratio on the surface thereof can be obtained. It is considered that as described above, the first boron compound forms $Li_3BO_3$ to contribute to the growth of the crystal structure of the lithium-nickel composite oxide, whereas the second boron compound B forms $LiBO_2$ to contribute to inhibition of gelation of the positive electrode mixture paste caused by the excessive lithium such as lithium hydroxide present on the surface of the first lithium-nickel composite oxide.

When the boron mass ratio A/B is less than 0.005, a large amount of the second boron compound B is added (mixed) to the first lithium-nickel composite oxide, in which the crystal structure does not sufficiently grow, and lithium within the crystals of the first lithium-nickel composite oxide easily reacts with boron to reduce in amount, and battery capacity may reduce. On the other hand, when the boron mass ratio A/B is greater than 10, the added amount of the first boron compound or the second boron compound exceeds the above range, which is thus not preferred.

At the mixing process (Step S30), the first lithium-nickel composite oxide and the second boron compound are mixed with each other sufficiently to the extent that the skeleton of the first lithium-nickel composite oxide is not destroyed. During the mixing, the excessive lithium containing lithium hydroxide in the first lithium-nickel composite oxide and the second boron compound react with each other to form $LiBO_2$. Consequently, $Li_3BO_3$ formed at the firing process (Step S20) and $LiBO_2$ formed at the mixing process (Step S30) are present on the surface of the second lithium-nickel composite oxide to be obtained.

For the mixing, general mixers can be used; a shaker mixer, a Loedige mixer, a Julia mixer, or a V blender can be used, for example. The mixing time is not limited to a particular time, may be any time for the first lithium-nickel composite oxide and the second boron compound to sufficiently be mixed to form $LiBO_2$, and can be about at least 3 minutes and up to 1 hour, for example.

The formation of $LiBO_2$ at this mixing process (Step S30) can be determined by X-ray diffraction, for example. The mixing is preferably performed to the extent that in the obtained positive electrode active material powder indicating the shape of the second boron compound B is not observed when observed using a scanning electron microscope (SEM).

The obtained positive electrode active material of the present embodiment has a high battery capacity when used for a secondary battery and can inhibit gelation of the positive electrode mixture paste. The positive electrode active material of the present embodiment can have a higher initial discharging capacity compared with a positive electrode active material that does not contain any boron compound and has a similar composition except boron, for example. The positive electrode active material of the present embodiment can inhibit gelation of the positive electrode mixture paste in stabilization evaluation described in examples, for example.

3. Nonaqueous Electrolyte Secondary Battery

A nonaqueous electrolyte secondary battery according to the present embodiment (hereinafter, also referred to as a "secondary battery") includes a positive electrode containing the positive electrode active material described above as a positive electrode material. The nonaqueous electrolyte secondary battery can be formed by components similar to those of known aqueous electrolyte secondary batteries and includes a positive electrode, a negative electrode, and a nonaqueous electrolyte solution, for example. The secondary battery may include a positive electrode, a negative electrode, and a solid electrolyte solution, for example.

The embodiment described below is only by way of example, and the nonaqueous electrolyte secondary battery according to the present embodiment can be performed in various modified and improved forms based on the knowledge of those skilled in the art based on the embodiment described in the present specification. The nonaqueous electrolyte secondary battery according to the present embodiment does not limit its use to particular uses.

Positive Electrode

Using the positive electrode active material for a nonaqueous electrolyte secondary battery obtained as described above, the positive electrode of the nonaqueous electrolyte secondary battery is produced as follows, for example.

First, a powdery positive electrode active material, a conductive material, and a binding agent are mixed together, active carbon and a solvent for viscosity adjustment or the like are further added thereto as needed, and this mixture is kneaded to produce a positive electrode mixture paste. In that process, the mixing ratios of the respective components in the positive electrode mixture paste are important factors determining the performance of the nonaqueous electrolyte secondary battery. When a solid content of the positive electrode mixture except the solvent is 100 parts by mass, like a positive electrode of general nonaqueous electrolyte secondary batteries, preferred are 60 to 95 parts by mass for the content of the positive electrode active material, 1 to 20 parts by mass for the content of the conductive material, and 1 to 20 parts by mass for the content of the binding agent.

The obtained positive electrode mixture paste is applied to the surface of a collector formed of aluminum foil and is dried to volatilize the solvent, for example. To increase electrode density, pressurizing may be performed with a roll press or the like as needed. The positive electrode in sheet form can thus be produced. The positive electrode in sheet form can be served to produce a battery by being subjected to cutting or the like into appropriate size in accordance with a target battery. However, the method for producing the positive electrode is not limited to the exemplified one and may be another method.

In producing the positive electrode, examples of the conductive material include graphite (natural graphite, artificial graphite, expanded graphite, and the like) and carbon black materials such as acetylene black and Ketjen black.

Examples of the binding agent, which plays a role of binding active material particles, include polyvinylidene fluoride (PVDF), polytetrafluoroethylene (PTFE), fluoro rubber, ethylene-propylene-diene rubber, styrene butadiene, cellulosic resins, and polyacrylic acid.

A solvent that disperses the positive electrode active material, the conductive material, and the active carbon and dissolves the binding agent is added to the positive electrode mixture as needed. For the solvent, specifically, an organic solvent such as N-methyl-2-pyrrolidone can be used. Active carbon can be added to the positive electrode mixture in order to increase electric double layer capacity.

Negative Electrode

The negative electrode is formed by applying a negative electrode mixture formed like a paste obtained by mixing a binding agent with metal lithium, lithium alloys, or the like or a negative electrode active material capable of occluding and de-inserting lithium ions and adding an appropriate solvent thereto to the surface of a metal-foil collector such as copper, drying it, and compressing it in order to increase electrode density as needed.

Examples of the negative electrode active material include organic compound fired bodies such as natural graphite, artificial graphite, and phenol resins and powdery bodies of carbon substances such as coke. In this case, for a negative electrode binding agent, fluorine-containing resins such as PVDF can be used similarly to the positive electrode; for a solvent dispersing the active material and the binding agent, an organic solvent such as N-methyl-2-pyrrolidone can be used.

Separator

A separator is interposed between the positive electrode and the negative electrode as needed. The separator separates the positive electrode and the negative electrode from each other and holds an electrolyte; examples thereof include thin films formed of polyethylene, polypropylene, or the like, the films having many minute holes.

Nonaqueous Electrolyte

For the nonaqueous electrolyte, a nonaqueous electrolyte solution can be used. For the nonaqueous electrolyte solution, one in which a lithium salt as a supporting electrolyte is dissolved in an organic solvent may be used, for example. For the nonaqueous electrolyte solution, one in which a lithium salt is dissolved in an ionic liquid may be used. The ionic liquid refers to a salt containing cations and anions other than lithium ions and showing liquid even at room temperature.

Examples of the organic solvent include cyclic carbonates such as ethylene carbonate, propylene carbonate, butylene carbonate, and trifluoro propylene carbonate; chain carbonates such as diethyl carbonate, dimethyl carbonate, ethylmethyl carbonate, and dipropyl carbonate; ether compounds such as tetrahydrofuran, 2-methyltetrahydrofuran, and dimethoxy ethane; sulfur compounds such as ethylmethyl sulfone and butane sulfone; and phosphorous compounds such as triethyl phosphate and trioctyl phosphate; one selected from the above can be used singly, or two or more can be used in combination.

Examples of the supporting electrolyte include $LiPF_6$, $LiBF_4$, $LiClO_4$, $LiAsF_6$, $LiN(CF_3SO_2)_2$, and composite salts thereof. Furthermore, the nonaqueous electrolyte solution may contain radical scavengers, surfactants, fire retardants, and the like.

For the nonaqueous electrolyte, a solid electrolyte may be used. The solid electrolyte has properties enduring high voltage. Examples of the solid electrolyte include inorganic solid electrolytes and organic solid electrolytes.

For the inorganic solid electrolyte, an oxide-based solid electrolyte, a sulfide-based solid electrolyte, or the like is used.

The oxide-based solid electrolyte is not limited to a particular one; any one containing oxygen (O) and having lithium ionic conductivity and electron insulating properties can be used. Examples of the oxide-based solid electrolyte include lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2$—$B_2O_3$—$ZnO$, $Li_{1+x}Al_xTi_{2-x}(PO_4)_3$ ($0 \leq X \leq 1$), $Li_{1+x}Al_xGe_{2-x}(PO_4)_3$ ($0 \leq X \leq 1$), $LiTi_2(PO_4)_3$, $Li_{3x}La_{2/3-x}TiO_3$ ($0 \leq X \leq 2/3$), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$.

The sulfide-based solid electrolyte is not limited to a particular one; any one containing sulfur (S) and having lithium ionic conductivity and electron insulating properties can be used. Examples of the sulfide-based solid electrolyte include $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_7S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$.

For the inorganic solid electrolyte, any other than the above may be used; examples thereof include $Li_3N$, $LiI$, and $Li_3N$—$LiI$—$LiOH$.

The organic solid electrolyte is not limited to a particular one so long as it is a polymer compound indicating ionic conductivity; examples thereof include polyethylene oxide, polypropylene oxide, and copolymers of these. The organic solid electrolyte may contain a supporting electrolyte (a lithium salt). When the solid electrolyte is used, the solid electrolyte may also be mixed into the positive electrode material in order to ensure contact between the electrolyte and the positive electrode active material.

Shape and Configuration of Battery

The nonaqueous electrolyte secondary battery according to the present embodiment including the positive electrode, the negative electrode, the separator, and the nonaqueous electrolyte or the positive electrode, the negative electrode, and the solid electrolyte described in the foregoing can be of various shapes such as a cylindrical shape and a laminated shape.

When the nonaqueous electrolyte solution is used as the nonaqueous electrolyte, the positive electrode and the negative electrode are laminated via the separator to form an electrode body; the obtained electrode body is impregnated with the nonaqueous electrolyte solution, a positive electrode collector and a positive electrode terminal communicating with the outside and a negative electrode collector and a negative electrode terminal communicating with the outside are each connected using a collector lead, and the electrode body is hermetically sealed in a battery case to complete the nonaqueous electrolyte secondary battery.

EXAMPLES

The following describes the present invention more specifically with reference to examples and comparative examples of the present invention; the present invention is not limited by these examples at all. The examples and the comparative examples were evaluated by measurement results using the following apparatuses and methods.

Entire Particle Composition

The obtained positive electrode active material was dissolved with nitric acid and was then measured with an ICP emission spectroscopic apparatus (ICPS-8100 manufactured by Shimadzu Corporation).

Compound Type Identification

The obtained positive electrode active material was evaluated with an X-ray diffraction apparatus (product name: X'Pert PRO manufactured by Panalytical).

Evaluation of Battery Characteristics

Production of Coin-Type Battery for Evaluation

Figure 2:
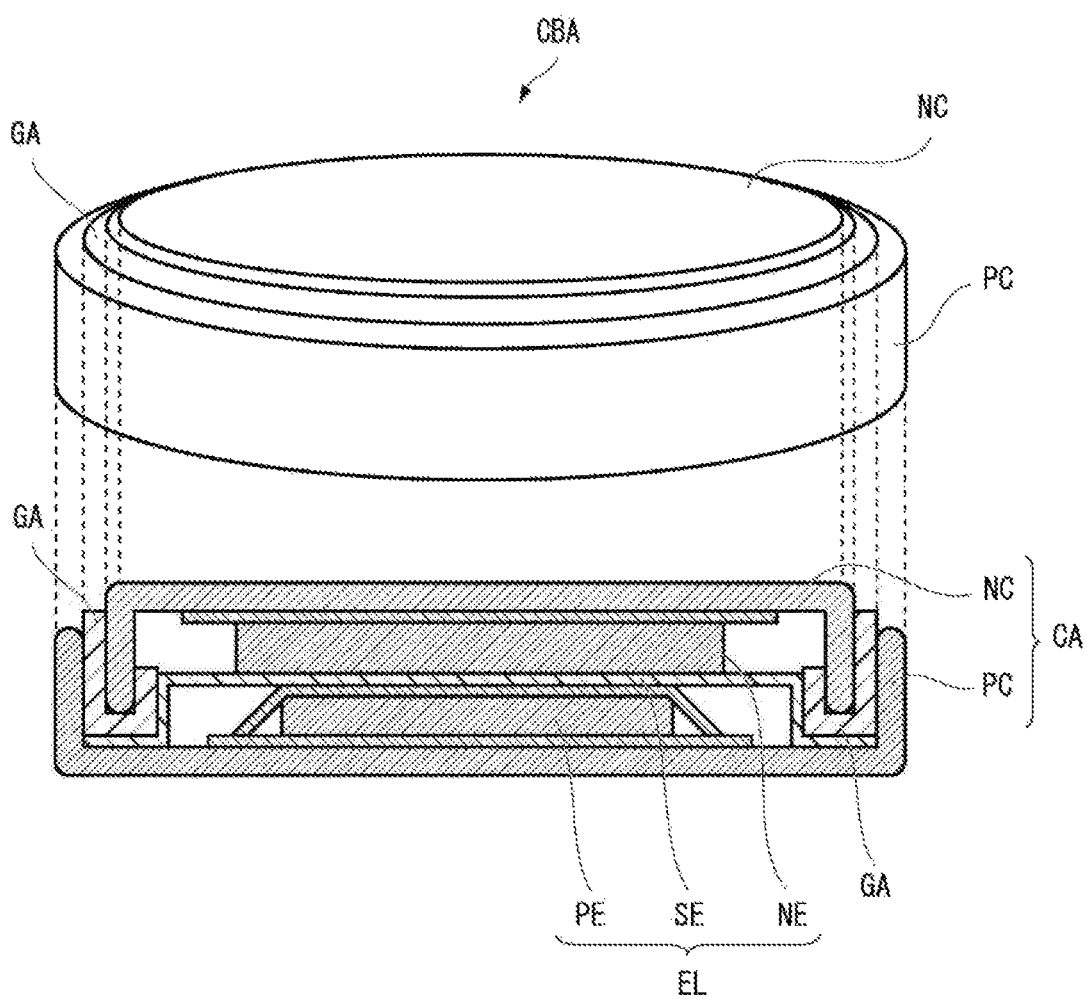
FIG. 2 is a schematic sectional view of a coin-type battery used for battery evaluation.

FIG. 2 is a diagram schematically illustrating a coin-type battery CBA for evaluation. As illustrated in FIG. 6, the coin-type battery CBA includes an electrode EL and a case CA housing this electrode EL therewithin. The electrode EL includes a positive electrode PE, a separator SE1, and a negative electrode NE, which are laminated in this order and are housed in the case CA such that the positive electrode PE is in contact with the inner face of a positive electrode can PC, whereas the negative electrode NE is in contact with the inner face of a negative electrode can NC. The coin-type battery CBA was produced as follows.

Into 70% by mass of the obtained positive electrode active material, 20% by mass of acetylene black and 10% by mass of PTFE were mixed, 150 mg of which was taken out to produce a palette as the positive electrode PE. Using lithium metal as the negative electrode NE and using an equal amount mixed solution of ethylene carbonate (EC) and diethyl carbonate (DEC) with 1 M of $LiClO_4$ as a supporting electrolyte (manufactured by Tomiyama Pure Chemical Industries, Ltd.) as the electrolyte solution, the coin-type battery CBA of the 2032 type was produced in a glove box with an Ar atmosphere the dew point of which was controlled to −80° C. The performance of the produced coin-type battery CBA was evaluated.

For an initial discharging capacity, the coin-type battery CBA was allowed to stand for about 24 hours after production and was charged to a cutoff voltage 4.3 V with a current density to the positive electrode of 0.1 mA/cm² after an open circuit voltage (OCV) stabilized, and a discharging capacity when discharged to a cutoff voltage 3.0 V after a one-hour suspension was measured and was determined to be the initial discharging capacity.

Method for Evaluating Positive Electrode Mixture Paste Stability

A positive electrode mixture paste was produced by mixing 20.0 g of the positive electrode active material for a nonaqueous electrolyte secondary battery, 2.35 g of carbon powder as a conductive auxiliary agent, 14.7 g of KF polymer L #7208 (solid content: 8% by mass) as a binding agent, and 5.1 g of N-methyl-2-pyrrolidone (NMP) as a solvent together with a planetary centrifugal mixer. The positive electrode mixture paste stability was evaluated by storing the produced positive electrode mixture paste in a sealed container at room temperature for seven days and visually observing it. One that did not gelate was evaluated to be A, whereas one that gelated was evaluated to be B.

Example 1

$H_3BO_3$ (manufactured by Wako Pure Chemical Industries, Ltd.) as the first boron compound in an amount such that the boron amount A was 0.03% by mass relative to a positive electrode active material to be obtained was added to a nickel composite hydroxide (composition formula: $Ni_{0.88}Co_{0.09}Al_{0.03}(OH)_2$) with an average particle diameter of 13 μm, and lithium hydroxide was mixed thereinto so as to give Li/(Ni+Co+Al)=1.03 to form a mixture. The mixing was performed using a shaker mixer (TURBULA Type T2C manufactured by Willy A. Bachofen (WAB) AG). This obtained mixture was fired in an oxygen flow (oxygen: 100% by volume) at 750° C. for 8 hours, was cooled, and was then crushed. X-ray diffraction detected peaks of lithium nickelate and $Li_3BO_3$, by which, together with an ICP measurement result, it was determined that the product was a lithium-nickel composite oxide represented by a composition formula $Li_{1.03}Ni_{0.33}Co_{0.09}Al_{0.03}O_2$ in which $Li_3BO_3$ was present on the surface thereof. Furthermore, $H_3BO_3$ as the second boron compound was added in an amount such that the boron amount B was 0.3% by mass relative to the positive electrode active material to be obtained, which was mixed using a shaker Mixer. X-ray diffraction detected peaks of lithium nickelate, $Li_3BO_3$, and $LiBO_2$, by which it was determined that the product was a lithium-nickel composite oxide represented by a composition formula $Li_{1.03}Ni_{0.33}Co_{0.09}Al_{0.03}O_2$ in which $Li_3BO_3$ and $LiBO_2$ were present on the surface thereof.

Example 2

In Example 2, a positive electrode active material was obtained similarly to Example 1 except that $H_3BO_3$ as the first boron compound was added so as to give a boron amount A of 0.005% by mass relative to the positive electrode active material and $H_3BO_3$ as the second boron compound was added so as to give a boron amount B of 0.05% by mass. X-ray diffraction detected peaks of lithium nickelate, $Li_3BO_3$, and $LiBO_2$, by which it was determined that the product was a lithium-nickel composite oxide represented by a composition formula $Li_{1.03}Ni_{0.33}Co_{0.09}Al_{0.03}O_2$ in which $Li_3BO_3$ and $LiBO_2$ were present on the surface thereof.

Example 3

In Example 3, a positive electrode active material was obtained similarly to Example 1 except that $H_3BO_3$ as the first boron compound was added so as to give a boron amount A of 0.08% by mass relative to the positive electrode active material and $H_3BO_3$ as the second boron compound was added so as to give a boron amount B of 0.5% by mass. X-ray diffraction detected peaks of lithium nickelate, $Li_3BO_3$, and $LiBO_2$, by which it was determined that the product was a lithium-nickel composite oxide represented by a composition formula $Li_{1.03}Ni_{0.33}Co_{0.09}Al_{0.03}O_2$ in which $Li_3BO_3$ and $LiBO_2$ were present on the surface thereof.

Example 4

In Example 4, a positive electrode active material was obtained similarly to Example 1 except that $H_3BO_3$ as the first boron compound was added so as to give a boron amount A of 0.002% by mass relative to the positive electrode active material and $H_3BO_3$ as the second boron compound was added so as to give a boron amount B of 0.2% by mass. X-ray diffraction detected peaks of lithium nickelate, $Li_3BO_3$, and $LiBO_2$, by which it was determined that the product was a lithium-nickel composite oxide represented by a composition formula $Li_{1.03}Ni_{0.33}Co_{0.09}Al_{0.03}O_2$ in which $Li_3BO_3$ and $LiBO_2$ were present on the surface thereof.

Example 5

In Example 5, a positive electrode active material was obtained similarly to Example 1 except that $H_3BO_3$ as the first boron compound was added so as to give a boron amount A of 0.1% by mass relative to the positive electrode active material and $H_3BO_3$ as the second boron compound was added so as to give a boron amount B of 0.01% by mass. X-ray diffraction detected peaks of lithium nickelate, $Li_3BO_3$, and $LiBO_2$, by which it was determined that the product was a lithium-nickel composite oxide represented by a composition formula $Li_{1.03}Ni_{0.33}Co_{0.09}Al_{0.03}O_2$ in which $Li_3BO_3$ and $LiBO_2$ were present on the surface thereof.

Example 6

In Example 6, a positive electrode active material was obtained similarly to Example 1 except that $B_2O_3$ was used as the first and second boron compounds. X-ray diffraction detected peaks of lithium nickelate, $Li_3BO_3$, and $LiBO_2$, by which it was determined that the product was a lithium-nickel composite oxide represented by a composition formula $Li_{1.03}Ni_{0.33}Co_{0.09}Al_{0.03}O_2$ in which $Li_3BO_3$ and $LiBO_2$ were present on the surface thereof.

Comparative Example 1

In Comparative Example 1, a positive electrode active material was obtained similarly to Example 1 except that $H_3BO_3$ as the first boron compound was added so as to give a boron amount A of 0.0005% by mass relative to the positive electrode active material and $H_3BO_3$ as the second boron compound was added so as to give a boron amount B of 0.05% by mass. X-ray diffraction detected peaks of lithium nickelate and $LiBO_2$, by which it was determined that the product was a lithium-nickel composite oxide represented by a composition formula $Li_{1.03}Ni_{0.33}Co_{0.09}Al_{0.03}O_2$ in which $LiBO_2$ was present on the surface thereof.

Comparative Example 2

In Comparative Example 2, a positive electrode active material was obtained similarly to Example 1 except that $H_3BO_3$ as the first boron compound was added so as to give a boron amount A of 0.005% by mass relative to the positive electrode active material and $H_3BO_3$ as the second boron compound was added so as to give a boron amount B of 0.005% by mass. X-ray diffraction detected peaks of lithium nickelate, $Li_3BO_3$, and $LiBO_2$, by which it was determined that the product was a lithium-nickel composite oxide represented by a composition formula $Li_{1.03}Ni_{0.33}Co_{0.09}Al_{0.03}O_2$ in which $Li_3BO_3$ and $LiBO_2$ were present on the surface thereof.

Comparative Example 3

In Comparative Example 3, a positive electrode active material was obtained similarly to Example 1 except that $H_3BO_3$ as the first boron compound was added so as to give a boron amount A of 0.002% by mass relative to the positive electrode active material and $H_3BO_3$ as the second boron compound was added so as to give a boron amount B of 0.5% by mass. X-ray diffraction detected peaks of lithium nickelate, $Li_3BO_3$, and $LiBO_2$, by which it was determined that the product was a lithium-nickel composite oxide represented by a composition formula $Li_{1.03}Ni_{0.33}Co_{0.09}Al_{0.03}O_2$ in which $Li_3BO_3$ and $LiBO_2$ were present on the surface thereof.

$H_3BO_3$ as the first boron compound was added so as to give a boron amount A of 0.03% by mass relative to the positive electrode active material and the second boron compound was not added. X-ray diffraction detected peaks of lithium nickelate and $Li_3BO_3$, by which it was determined that the product was a lithium-nickel composite oxide represented by a composition formula $Li_{1.03}Ni_{0.88}Co_{0.09}Al_{0.03}O_2$ in which $Li_3BO_3$ was present on the surface thereof.

Comparative Example 6

In Comparative Example 6, a positive electrode active material was obtained similarly to Example 1 except that the first boron compound was not added and $H_3BO_3$ as the second boron compound was added so as to give a boron amount B of 0.3% by mass relative to the positive electrode active material. X-ray diffraction detected peaks of lithium nickelate and $LiBO_2$, by which it was determined that the product was a lithium-nickel composite oxide represented by a composition formula $Li_{1.03}Ni_{0.88}Co_{0.09}Al_{0.03}O_2$ in which $LiBO_2$ was present on the surface thereof.

TABLE 1

| | First boron compound | | Second boron compound | | Positive electrode active material | | | Positive electrode | Secondary battery |
|---|---|---|---|---|---|---|---|---|---|
| | Type | Boron amount A % by mass* | Type | Boron amount B % by mass* | Boron compound | Boron in total % by mass* | Boron amount A/Boron amount B | mixture paste Stability evaluation | Initial discharging capacity mAh/g |
| Example 1 | $H_3BO_3$ | 0.03 | $H_3BO_3$ | 0.3 | $Li_3BO_3$, $LiBO_2$ | 0.33 | 0.1 | A | 210 |
| Example 2 | $H_3BO_3$ | 0.005 | $H_3BO_3$ | 0.05 | $Li_3BO_3$, $LiBO_2$ | 0.055 | 0.1 | A | 206 |
| Example 3 | $H_3BO_3$ | 0.08 | $H_3BO_3$ | 0.5 | $Li_3BO_3$, $LiBO_2$ | 0.58 | 0.16 | A | 208 |
| Example 4 | $H_3BO_3$ | 0.002 | $H_3BO_3$ | 0.2 | $Li_3BO_3$, $LiBO_2$ | 0.202 | 0.01 | A | 205 |
| Example 5 | $H_3BO_3$ | 0.1 | $H_3BO_3$ | 0.01 | $Li_3BO_3$, $LiBO_2$ | 0.11 | 10 | A | 206 |
| Example 6 | $B_2O_3$ | 0.03 | $B_2O_3$ | 0.3 | $Li_3BO_3$, $LiBO_2$ | 0.33 | 0.1 | A | 209 |
| Comparative Example 1 | $H_3BO_3$ | 0.0005 | $H_3BO_3$ | 0.05 | $LiBO_2$ | 0.051 | 0.01 | A | 203 |
| Comparative Example 2 | $H_3BO_3$ | 0.005 | $H_3BO_3$ | 0.005 | $Li_3BO_3$, $LiBO_2$ | 0.01 | 1 | B | 205 |
| Comparative Example 3 | $H_3BO_3$ | 0.002 | $H_3BO_3$ | 0.5 | $Li_3BO_3$, $LiBO_2$ | 0.50 | 0.004 | A | 201 |
| Comparative Example 4 | — | 0 | — | 0 | — | 0 | — | B | 203 |
| Comparative Example 5 | $H_3BO_3$ | 0.03 | — | 0 | $Li_3BO_3$ | 0.03 | — | B | 209 |
| Comparative Example 6 | — | 0 | $H_3BO_3$ | 0.3 | $LiBO_2$ | 0.3 | 0 | A | 203 |

*indicates the content of boron relative to the entire amount of the positive electrode active material.

Comparative Example 4

In Comparative Example 4, a positive electrode active material was obtained similarly to Example 1 except that the first and second boron compounds were not added X-ray diffraction detected a peak of lithium nickelate, by which it was determined that the product was a lithium-nickel composite oxide represented by a composition formula $Li_{1.03}Ni_{0.88}Co_{0.09}Al_{0.03}O_2$.

Comparative Example 5

In Comparative Example 5, a positive electrode active material was obtained similarly to Example 1 except that Table 1 lists results of measurement of the initial discharging capacity after producing coin-type batteries CBA using the positive electrode active materials obtained in the examples and the comparative examples and stability evaluation results of the positive electrode mixture pastes.

In Examples 1 to 6, in which an appropriate amount of the boron compound was added, compared with Comparative Example 4, in which the first and second boron compounds were not added, gelation of the positive electrode mixture paste was inhibited, and the initial discharging amount (the battery capacity) also increased. On the other hand, in Comparative Example 1, in which the added amount of the first boron compound (the boron amount A) was small, the battery capacity did not improve in the battery evaluation using the obtained positive electrode active material. The positive electrode active material of Comparative Example 2, which was small in the added amount of the second boron compound (the boron amount B), was not able to inhibit gelation of the positive electrode mixture paste. In Comparative Example 3, the added amount of the second boron compound (the boron amount B) was smaller than the added amount of the first boron compound (the boron amount A), and the battery evaluation showed a reduction in the battery capacity. In Comparative Example 5, the second boron compound was not added, and gelation of the positive electrode mixture paste was not able to be inhibited. In Comparative Example 6, the first boron compound was not added, and the battery evaluation using the obtained positive electrode active material showed no improvement in the capacity.

INDUSTRIAL APPLICABILITY

The positive electrode active material for a nonaqueous electrolyte secondary battery of the present invention increases battery capacity when used for a positive electrode material of a secondary battery and can inhibit gelation of a positive electrode mixture paste and is thus suitable for a positive electrode active material of a lithium-ion secondary battery used as a power supply for hybrid vehicles and electric vehicles in particular.

The technical scope of the present invention is not limited to the aspects described in the embodiments and the like. One or more of the requirements described in the embodiments and the like may be omitted. The requirements described in the embodiments and the like can be combined as appropriate. Japanese Patent Application No. 2017-108035 and all the literature cited in the embodiments and the like are herein incorporated by reference in their entirety to the extent allowed by the law.

DESCRIPTION OF REFERENCE SIGNS

CBA Coin-type battery
CA Case
PC Positive electrode can
NC Negative electrode can
GA Gasket
EL Electrode
PE Positive electrode
NE Negative electrode
SE Separator

The invention claimed is:
1. A positive electrode active material for a nonaqueous electrolyte secondary battery, the positive electrode active material comprising:
a lithium-nickel composite oxide represented by a general formula: $Li_aNi_{1-x-y}Co_xM_yO_{2+\alpha}$ (where $0.01 \leq x \leq 0.35$, $0 \leq y \leq 0.10$, $0.95 \leq a \leq 1.10$, and $0 \leq \alpha \leq 0.2$; and M is at least one element selected from Mn, V, Mg, Mo, Nb, Ti, and Al); and
a boron compound, wherein
at least part of the boron compound is present on a surface of the lithium-nickel composite oxide in the form of $Li_3BO_3$ and $LiBO_2$, and a mass ratio ($Li_3BO_3/LiBO_2$) between $Li_3BO_3$ and $LiBO_2$ is at least 0.005 and up to 10,
boron is contained in an amount of at least 0.011% by mass and up to 0.6% by mass relative to an entire amount of the positive electrode active material, and
only peaks of $Li_3BO_3$ and $LiBO_2$ are detected by X-ray diffraction, which are the only peaks other than a peak of lithium nickelate.
2. A method for producing a positive electrode active material for a nonaqueous electrolyte secondary battery according to claim 1, the method comprising:
mixing a nickel composite hydroxide or a nickel composite oxide, a lithium compound, and a first boron compound capable of reacting with lithium together so as to give a boron amount A in the first boron compound of at least 0.001% by mass and up to 0.1% by mass relative to an entire amount of a positive electrode active material to obtain a lithium mixture;
firing the lithium mixture in an oxygen atmosphere at at least 700° C. and up to 800° C. to obtain a first lithium-nickel composite oxide; and
mixing the first lithium-nickel composite oxide and a second boron compound capable of reacting with lithium with each other so as to give a boron amount B in the second boron compound of at least 0.01% by mass and up to 0.5% by mass relative to the entire amount of the positive electrode active material and so as to give a ratio (A/B) between the boron amount A in the first boron compound and the boron amount B in the second boron compound of at least 0.005 and up to 10 to obtain a second lithium-nickel composite oxide, wherein
the first boron compound and the second boron compound are the same compound or different compounds, and
the second lithium-nickel composite oxide is represented by a general formula $Li_aNi_{1-x-y}Co_xM_yO_{2+\alpha}$ (where $0.01 \leq x \leq 0.35$, $0 \leq y \leq 0.10$, $0.95 \leq a \leq 1.10$, and $0 \leq \alpha \leq 0.2$; and M is at least one element selected from Mn, V, Mg, Mo, Nb, Ti, and Al) and has $Li_3BO_3$ and $LiBO_2$ on a surface thereof.
3. The method for producing a positive electrode active material for a nonaqueous electrolyte secondary battery according to claim 2, wherein the first boron compound contains at least one selected from $H_3BO_3$, $B_2O_3$, and $LiBO_2$.
4. The method for producing a positive electrode active material for a nonaqueous electrolyte secondary battery according to claim 2, wherein the second boron compound contains either one or both of $H_3BO_3$ and $B_2O_3$.
5. A positive electrode mixture paste for a nonaqueous electrolyte secondary battery, the positive electrode mixture paste comprising the positive electrode active material for a nonaqueous electrolyte secondary battery according to claim 1.
6. A nonaqueous electrolyte secondary battery comprising a positive electrode, a negative electrode, a separator, and a nonaqueous electrolyte, the positive electrode comprising the positive electrode active material according to claim 1.
7. The positive electrode active material according to claim 1, wherein the mass ratio ($Li_3BO_3/LiBO_2$) between $Li_3BO_3$ and $LiBO_2$ is at least 0.005 and up to 1.
8. The positive electrode active material according to claim 1, which has been prepared by a method comprising mixing a lithium-nickel composite oxide containing an excessive lithium and a boron-containing compound, wherein
$LiBO_2$ has been formed by reacting the boron-containing compound with the excessive lithium in the lithium-nickel composite oxide.
9. The positive electrode active material according to claim 1, which has been prepared by a method comprising preparing a mixture of a nickel composite hydroxide or a nickel composite oxide, a lithium compound, and a boron-containing compound, wherein $Li_3BO_3$ have been formed by firing the mixture.

10. The positive electrode active material according to claim 1, wherein the at least part of the boron compound is present on a top surface of the lithium-nickel composite oxide.

* * * * *